US012778345B2

(12) United States Patent
Tanaka et al.

(10) Patent No.: US 12,778,345 B2
(45) Date of Patent: Nov. 3, 2026

(54) COMPONENT SYSTEMS FOR AUTOMATED COOKING

(71) Applicant: Lab2Fab, LLC, Fremont, CA (US)

(72) Inventors: Samuel Lewis Tanaka, San Leandro, CA (US); Cory David Lent, Campbell, CA (US); John Paul Norman, San Jose, CA (US); Shawn Lange, Walnut Creek, CA (US)

(73) Assignee: Lab2Fab, LLC, Fremont, CA (US)

( * ) Notice: Subject to any disclaimer, the term of this patent is extended or adjusted under 35 U.S.C. 154(b) by 864 days.

(21) Appl. No.: 18/098,437

(22) Filed: Jan. 18, 2023

(65) Prior Publication Data

US 2023/0225559 A1 Jul. 20, 2023

Related U.S. Application Data

(60) Provisional application No. 63/394,154, filed on Aug. 1, 2022, provisional application No. 63/349,873, filed (Continued)

(51) Int. Cl.
*A47J 37/12* (2006.01)
*A47J 43/08* (2006.01)
(Continued)

(52) U.S. Cl.
CPC ....... *A47J 37/1228* (2013.01); *A47J 37/1295* (2013.01); *A47J 43/08* (2013.01);
(Continued)

(58) Field of Classification Search
CPC .... A47J 37/1228; A47J 37/1295; A47J 43/08; B25J 11/0045; B25J 15/0253; B25J 19/02
(Continued)

(56) References Cited

U.S. PATENT DOCUMENTS 6,427,583 B1 8/2002 Shimansky et al.
8,051,795 B2 * 11/2011 Dorsten .............. A47J 37/1219 118/308

(Continued)

FOREIGN PATENT DOCUMENTS

WO WO-2007145516 A2 * 12/2007 .......... A47J 37/1276
WO 2013100725 A1 7/2013

(Continued)

OTHER PUBLICATIONS

Machine Translation of WO2007145516A2 (Year: 2025).*
International Search Report and Written Opinion dated Jul. 4, 2023 for PCT Application No. PCT/US2023/011039.

*Primary Examiner* — John J Norton
*Assistant Examiner* — Thomas J Ward
(74) *Attorney, Agent, or Firm* — Van Hoven PC; Stefan D. Osterbur; Joshua Van Hoven

(57) ABSTRACT

A food processing apparatus comprises a basket retainer configured to support a basket of consumable items above a food processing device. The food processing apparatus may also include a reciprocating agitator configured to impart a repetitive contact to the basket, thereby inducing motion of the consumable items within the basket. In another example, guidance of a robot performing tasks such as moving a basket of consumable or food items may be enhanced using one or more mechanical guides configured to catch, engage, or otherwise contact a corresponding feature of a basket for the consumable/food items. In another example, one or more sensors may be provided to provide an indication that a robot gripper is within a proximity of a basket and/or handle thereof.

19 Claims, 12 Drawing Sheets

Related U.S. Application Data on Jun. 7, 2022, provisional application No. 63/300,445, filed on Jan. 18, 2022.

(51) Int. Cl.

| | |
|---|---|
| ***B25J 11/00*** | (2006.01) |
| ***B25J 15/02*** | (2006.01) |
| ***B25J 19/02*** | (2006.01) |

(52) U.S. Cl.

CPC ....... *B25J 11/0045* (2013.01); *B25J 15/0253* (2013.01); *B25J 19/02* (2013.01)

(58) Field of Classification Search

USPC ............................................................ 99/325

See application file for complete search history.

(56) References Cited

U.S. PATENT DOCUMENTS

| | | | |
|---|---|---|---|
| 10,104,992 | B2 | 10/2018 | Macdonald et al. |
| 11,167,421 | B2 | 11/2021 | Sinnet et al. |
| 2020/0046168 | A1 * | 2/2020 | Sinnet .................... B25J 9/1697 |
| 2021/0235929 | A1 | 8/2021 | Perkins et al. |
| 2022/0055225 | A1 | 2/2022 | Sinnet et al. |
| 2022/0346597 | A1 | 11/2022 | Reichelderfer et al. |
| 2022/0354306 | A1 | 11/2022 | Sinnet et al. |
| 2023/0093737 | A1 | 3/2023 | Hohler et al. |

FOREIGN PATENT DOCUMENTS

| | | | |
|---|---|---|---|
| WO | 2022076558 | A1 | 4/2022 |
| WO | 2023063507 | A1 | 4/2023 |

* cited by examiner

COMPONENT SYSTEMS FOR AUTOMATED COOKING

CROSS-REFERENCE TO RELATED APPLICATIONS

This application claims priority to U.S. Provisional Patent Application No. 63/300,445, filed on Jan. 18, 2022, U.S. Provisional Patent Application No. 63/349,873, filed on Jun. 7, 2022, and U.S. Provisional Patent Application No. 63/394,154, filed on Aug. 1, 2022. The contents of each of these applications are hereby expressly incorporated by reference in their entireties for all purposes.

BACKGROUND

Deep frying is a common cooking method often used by restaurants and fast food chains as a quick and inexpensive way to prepare foods. Some aspects of these operations may be relatively messy and/or dangerous due to spills, splashes, etc. of a cooking medium such as oil, and as such there is a continuing desire to automate or simplify various aspects of deep frying methods or systems.

For example, during the process of frying foods such as french fries, chicken, onion rings, etc., kitchen personnel will remove the fryer baskets from the frying medium with the consumable items inside of the basket, to shake the foods before reloading the basket into the frying medium. This process of shaking the basket during the frying process ensures an even, thorough frying of the food and also shakes off excess oil.

Additionally, automated devices operating within a cooking environment may move with respect to multiple axes to accomplish a variety of culinary tasks (e.g., flipping burgers, frying tater tots, filling drinks, plating meals, etc.). When frying foods, an automated food processing system may be implemented that, using an automated device (e.g., a robotic arm), moves downward in a food processing area (e.g., the oil contents of a fryer) to grip an attachment extension (e.g., a handle) extending from a first side of a basket, moves upward to lift the basket out of the food processing area, and moves forward to latch one or more attachment hooks, connected to a second side of the basket, to a hanger to allow the food processing container to rest above the food processing area. It will be understood that under normal conditions the automated device latches the one or more attachment hooks of the basket on a hanger of a food processing device (e.g., a deep fryer), where the one or more attachment hooks and the hanger are co-planar with respect to each other. In some examples, due to manufacturing tolerance and/or attrition from frying operation, the attachment extension (e.g., the handle) may experience twist (e.g., a misconfiguration that may include bend, tilt, etc.) relative to the attachment hook(s). This twist may result in a rotation of the one or more attachment hooks' x-z plane about its y-axis, obstructing the hanger plane (e.g., no longer making them co-planar) and, consequently, misaligning the attachment/basket hooks or preventing the automated device from latching the one or more basket hooks onto the hanger of the food processing device. Accordingly, the automated device may drop the food processing container into the food processing area, which halts the automated frying process. Twist of the attachment extension (e.g., the handle) may make basket placement difficult or unreliable. Alternate procedures (e.g., a camera vision system) exist to circumvent orientation issues (e.g., by locating fiducial marker(s) on baskets to perform spatial distance measuring in free space) generated by twist of the attachment extension but are very expensive and commonly require customized add-ons to food processing containers.

There is a continued desire to automate the above and other aspects of food preparation, such as for deep frying or other cooking or food processing devices.

SUMMARY

In at least some example illustrations, a food processing apparatus is provided, comprising a basket retainer configured to support a basket of consumable items above a food processing device. The food processing apparatus may also include a reciprocating agitator configured to impart a repetitive contact to the basket, thereby inducing motion of the consumable items within the basket.

In at least some examples, the agitator includes one of a rotary motor, a linear actuator, a vibrator, or a pneumatic cylinder.

In at least some example illustrations, the agitator comprises a rotary output and a linkage pivotally secured at an end thereof to the rotary output. The linkage may induce the reciprocal motion of the basket retainer via rotation of the rotary output.

In at least some examples, the reciprocal motion is along a first direction, and the agitator is configured to induce an additional motion in the basket retainer in a second direction, with the second direction being normal to the first direction.

In at least some example illustrations, the reciprocal motion is vertically oriented with respect to the basket retainer.

In at least some example approaches, the reciprocal motion is horizontally oriented with respect to the basket retainer.

In at least some examples, the basket retainer is configured to retain one of an edge of the basket or a basket handle.

In at least some example illustrations, the basket retainer includes one of a hook, a lip, a holding surface, or a support surface.

In at least some examples, the agitator comprises a pneumatic cylinder configured to impart repetitive contact to a handle of the basket.

In at least some example illustrations, the reciprocal motion is vertically oriented with respect to the basket retainer.

In at least some example approaches, the reciprocating agitator reciprocates at a frequency of up to six times per second, or 0-6 Hz.

In at least some example approaches, the reciprocating agitator is configured such that the repetitive contact is interspersed with a lack of contact between the reciprocating agitator and the basket.

In at least some example illustrations, the food processing device is a fryer.

In at least some example approaches, the basket retainer comprises a guide having a base configured to be positioned adjacent a basket mounting position on the food processing apparatus. The basket guide may narrow from the base to an uppermost portion. Opposing guide surfaces of the basket guide may extend from the uppermost portion toward the base and are configured to horizontally align a basket holder with respect to the basket mounting position as the basket holder descends toward the basket mounting position.

In at least some examples, the apparatus further includes a manipulator, comprising a first extension defining a first handle opening configured to receive a handle of the basket, and a second extension defining a second handle opening configured to receive the handle. The manipulator may also include a gripper assembly configured to enclose the handle within the first handle opening and the second handle opening. The manipulator may also include a sensor configured to determine a proximity of the handle to the second handle opening. In at least a subset of these examples, the sensor comprises at least one of a beam receiver, an imaging sensor, a position sensor, a pressure sensor, a proximity sensor, a motion sensor.

In at least some example illustrations, an automated food processing system is provided, comprising a basket having an attachment extension extending from a first side of the basket, and one or more attachment hooks located at a second side of the basket. The system may further include a robotic arm including a gripping mechanism configured to grip the attachment extension. While the attachment extension is gripped, the robotic arm is configured to move the basket with respect to a food processing device. The food processing device may include a food processing area and a basket retainer above the food processing area. The food processing device may also include a basket guide adjacent the basket retainer. The basket guide may narrow from a base adjacent a basket mounting position on the basket retainer to an uppermost portion. Further, opposing guide surfaces of the basket guide may extend from the uppermost portion toward the base and may be configured to horizontally align the one or more attachment hooks with respect to the basket mounting position as the robotic arm causes the food processing container to descend toward the basket mounting position.

In at least some example illustrations of an automated food processing system, the food processing device includes an agitator configured to induce a reciprocal motion of the basket retainer, thereby inducing motion of the basket.

In at least some examples, the one or more attachment hooks are disposed at an end of the basket opposite the attachment extension, wherein the one or more attachment hooks define a horizontal opening delimited at opposing sides corresponding to the opposing guide surfaces. In at least a subset of these examples, the horizontal opening is substantially equal to a width of the base.

In at least some example approaches, the automated food processing system further comprises a manipulator. The manipulator may include a first extension and a second extension, each having respective handle openings configured to receive a handle of the basket. The manipulator may also include a gripper assembly configured to enclose the handle within the first handle opening and the second handle opening and a sensor configured to determine a proximity of the handle to the second handle opening.

BRIEF DESCRIPTION OF THE FIGURES

The above and other features of the present disclosure, its nature and various advantages will be more apparent upon consideration of the following detailed description, taken in conjunction with the accompanying drawings in which.

DETAILED DESCRIPTION

Robotic automated food preparation systems have been developed for automating various kitchen operations of a restaurant. For example, each of U.S. patent application Ser. No. 17/494,664 (filed on Oct. 5, 2021) and U.S. Provisional Patent Application Ser. No. 63/088,162 (filed on Oct. 6, 2020) disclose examples of robotic automated food preparation systems that may be used to fry consumable items such as french fries, onion rings, chicken, etc., and the contents of these applications are hereby incorporated by reference in their entireties.

Various aspects of these example robotic automated food preparation systems may be further automated, as described in further detail below. More specifically, in some example approaches, an agitator is provided for shaking or agitating a plurality of consumable or food items, e.g., to encourage even distribution and/or breaking individual items apart within a basket, shake off excess cooking medium, etc. The agitator may reciprocate, thereby imparting a repetitive contact to a basket of consumable items.

In other examples, guidance of a robot performing tasks such as moving a basket of consumable or food items may be enhanced using one or more mechanical guides. More specifically, a guide may be employed which catches, engages, or otherwise contacts a corresponding feature of a basket for the consumable/food items. In another example, one or more sensors may be provided to provide an indication that a robot gripper is within a proximity of a basket and/or handle thereof.

Figure 1:
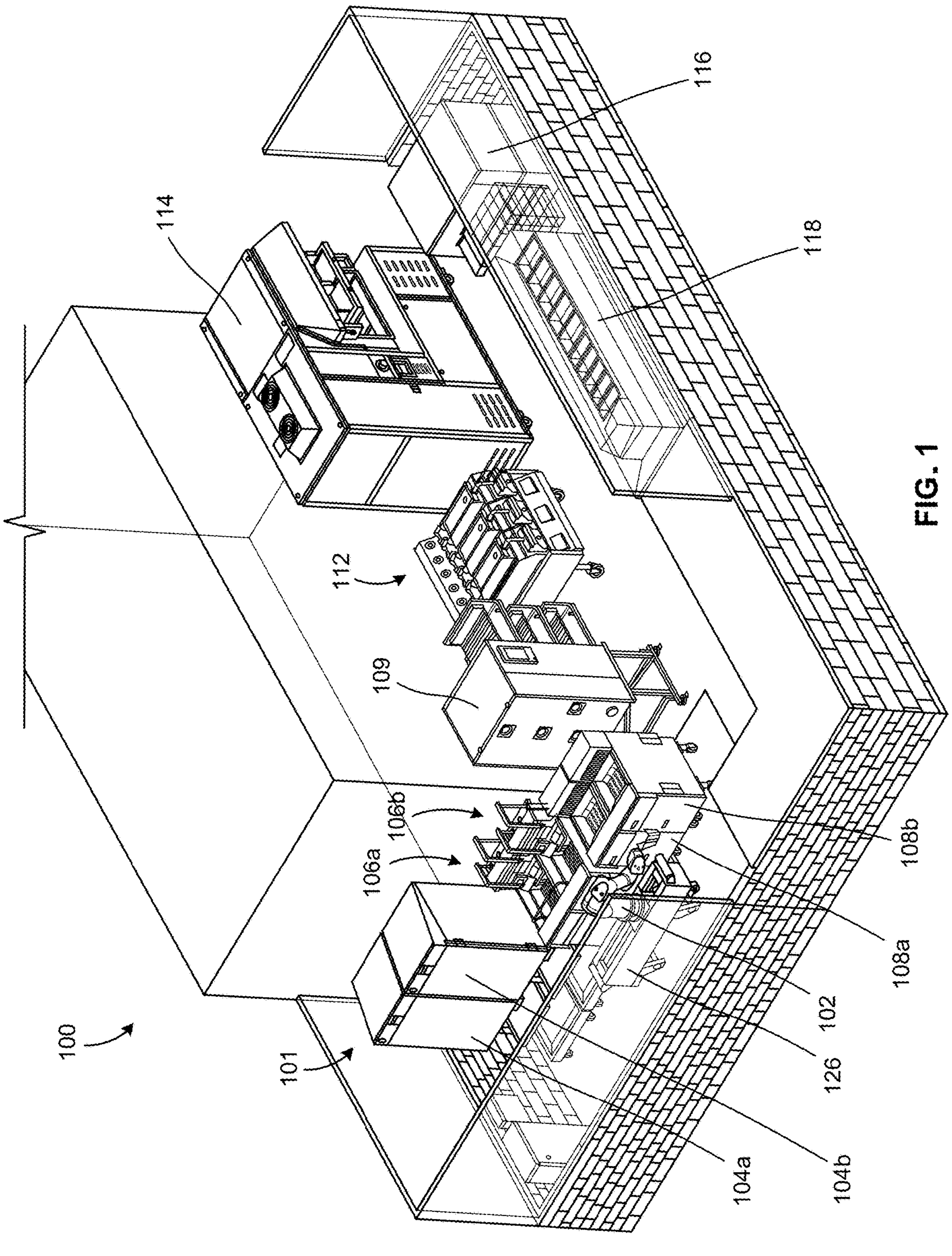
FIG. 1 shows a perspective view of a kitchen including an automated food preparation system having a robotic arm, in accordance with an embodiment of the present disclosure.

Turning now to FIG. 1, an example illustration of a partial restaurant operation is illustrated. Restaurant operations are generally divided into front-of-house operations and the back-of-house operations such as the illustrated kitchen operation of FIG. 1. Front-of-house operations may include entry and waiting areas for customers, ordering queues, employee stations, point of sale (PoS) systems, front-of-house employees (e.g., taking orders, delivering food, cleaning), staging areas for completed orders, dining areas, and other related customer-facing facilities and operations based on particular restaurant design and operations. By contrast, back-of-house operations such as illustrated in FIG. 1 generally include a number of stages and types of food storage, numerous racks for temporary storage of inventory to be used in food preparation, various types of food preparation equipment and preparation stations for preparing and combining prepared food items, racks for storage of partially prepared and prepared food items, and numerous employees, to handle food items and equipment from inventory.

Generally, the system 100 includes a back-of-house operation or kitchen for a restaurant, which employs a cooking apparatus 101 and a robotic arm 102. The system 100 may be integrated into any restaurant or kitchen operation. In some example approaches, the system 100 is integrated into a back-of-house operation of a restaurant, examples of which are described in U.S. patent application Ser. No. 16/780,797 and U.S. Provisional Patent Application Ser. No. 62/819,326, and the contents of each of these applications are hereby expressly incorporated by reference in their entireties.

In the example shown in FIG. 1, the system 100 includes refrigerated ingredient storage 104*a* and 104*b*, cooking devices 106*a* and 106*b*, food ingredient finishing areas 108*a*, 108*b*, refrigerated items 109, cooktop 112, warming/short-term storage area 114, dry food ingredient storage 116, and assembly/topping application 118. The system 100 may include any other components or subsystems that are convenient, e.g., freezers or refrigerators, bulk ingredient storage, liquid storage, etc. The back-of-house operations may also include numerous employees and operations that do not directly involve the preparation of food, such as loading areas for receiving inventory, dishwashing and sanitizing stations, storage areas, and offices for administrative employees such as management, accountants, etc.

The cooking apparatus 101 includes a plurality of processing devices for producing food, and in the example illustrated these processing devices include the refrigerated ingredient storages 104*a* and 104*b* (collectively, 104), cooking devices 106*a* and 106*b* (collectively, 106), and food ingredient finishing areas 108*a*, 108*b* (collectively, 108). These processing devices generally represent distinct locations in a process of producing, in this example, fried foods. The robot arm 102 may be used to move or manipulate food ingredients to and from the processing devices of the cooking apparatus 101 to produce cooked food(s) for serving. While the examples that follow illustrate the robot arm 102 in the context of system 100 and cooking apparatus 101, numerous other example approaches will be apparent upon consideration of the present disclosure. Accordingly, implementation of other example systems 100, cooking apparatuses 101, or robot arms 102 are not limited to the production of fried foods.

The cooking devices 106 are described herein as deep fat fryers, i.e., employing a volume of cooking medium, e.g., vegetable oil, peanut oil, or the like, which is heated to cook food ingredients. Food ingredients such as cut potatoes, battered onion rings, or the like, may be kept in refrigerated ingredient storage 104 and delivered to the fryers 106 and/or finishing areas 108 by robot arm 102. Upon completion of cooking the food ingredients, the robot arm 102 may move the food ingredients from the fryers 106 to the finishing areas 108. In the finishing areas 108, the cooked ingredients may be seasoned or otherwise finished. The finishing areas 108 may also have heating elements, lamps, or the like to keep the cooked food warm to allow serving on demand. Personnel in the kitchen operation 100 may collect the cooked food, e.g., in serving containers.

The robot arm 102 may be any robot capable of moving and manipulating food ingredients amongst the processing devices, i.e., the ingredient storage 104, cooking devices 106, and/or finishing areas 108. In the illustrated example seen in FIGS. 1 and 2, the robot arm 102 includes a plurality of rigid arm members 120 connected by respective joints 122. The robot arm 102 extends from a base 124, which is configured to move along a rail 126. The joints 122 are each configured to facilitate movement of an end effector 128 of the robot arm 102 amongst the cooking apparatus 101. For example, each of the joints 122 may be a single or a multi-axis joint allowing relative rotation between adjacent arm members 120. The joints 122 and arm members 120 cooperate with the sliding base 124 to provide multi-axis freedom of movement of the end effector 128 within the cooking apparatus 101.

Figure 2:
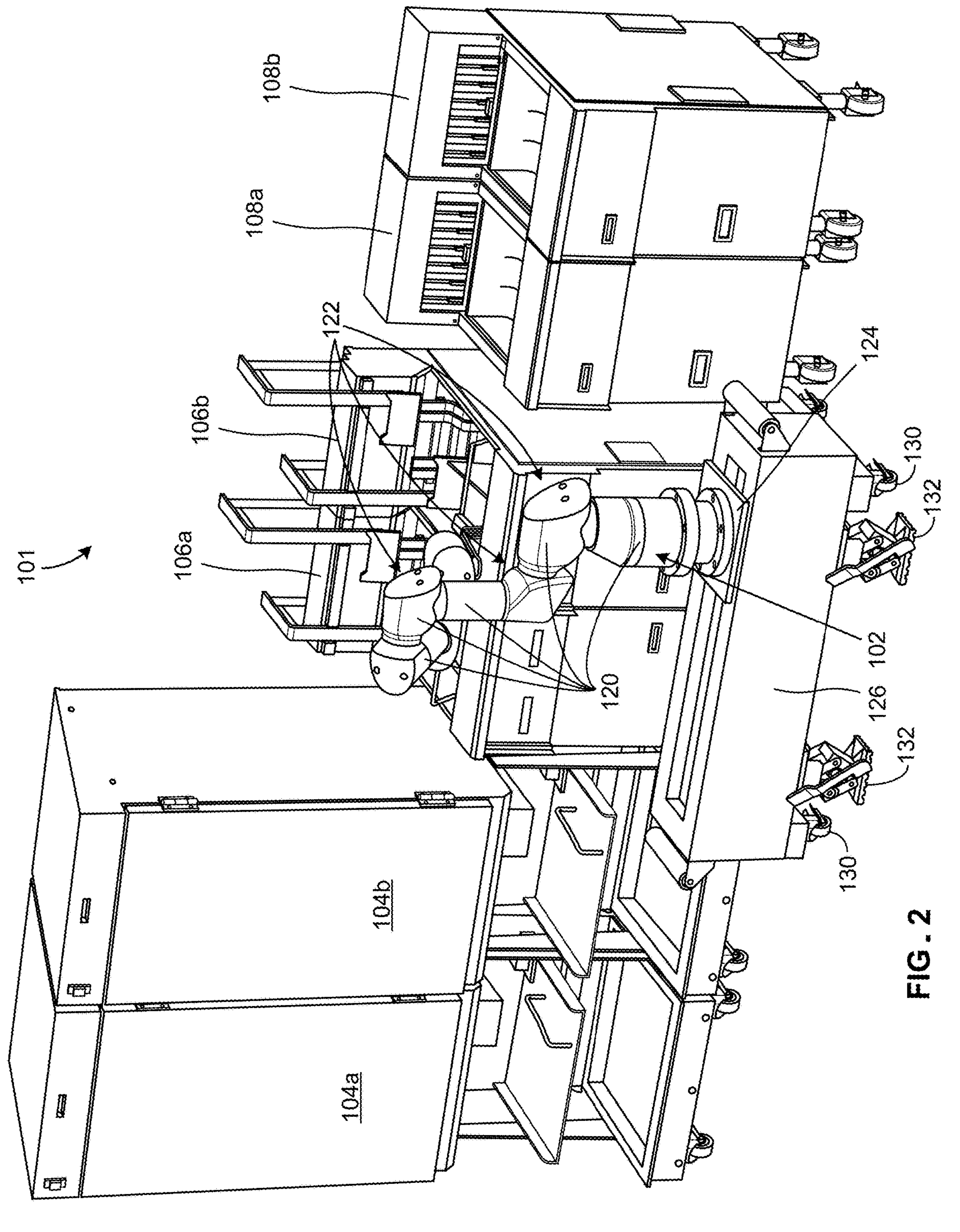
FIG. 2 shows another perspective view of the automated food preparation system and robotic arm of FIG. 1, in accordance with an embodiment of the present disclosure.

Referring now to FIG. 2, the rail 126 is described in further detail in the context of an example cooking apparatus 101, although the rail 126 may be used with other cooking apparatuses. Generally, the rail 126 provides a fixed location from which the robot arm 102 extends and moves an end effector 128, e.g., to move food and/or ingredients amongst processing devices or locations of the cooking apparatus 101. The rail 126 includes rollers 130, which may facilitate rolling movement of the robot arm 102 along a floor or ground surface, e.g., away from the cooking apparatus 101 for cleaning, maintenance, or the like. The rail 126 also includes lifts 132 at each end, which generally lift the rail 126 to prevent movement of the rail 126 along the ground/floor surface via the rollers 130.

While the robot arm 102 is movable via the rail 126 as noted above, it is desirable to fix a relative position of the rail 126 of the robot arm 102 relative to processing devices in the cooking apparatus 101, e.g., processing devices 104, 106, and/or 108, while the robot arm 102 is operating. In this manner, movements of the robot arm 102 may be controlled to facilitate accurate grasping, manipulation, and delivery of food ingredients within a cooking apparatus. The robot arm 102 may move amongst the processing devices 104, 106, and/or 108 according to a controller, as will be detailed further below. Additionally, it is desirable to allow the robot arm 102 to be moveable with respect to the processing devices 104, 106, and/or 108 to allow cleaning or maintenance of the robot arm 102 and/or the processing devices.

As noted above, in some examples it may be desirable to agitate or shake food or consumable items, e.g., before, during, or after being fried in one of the cooking devices 106. Turning now to FIGS. 3, 4, 5A, and 5B, example components systems for agitating or shaking food items are described in further detail.

Figure 3:
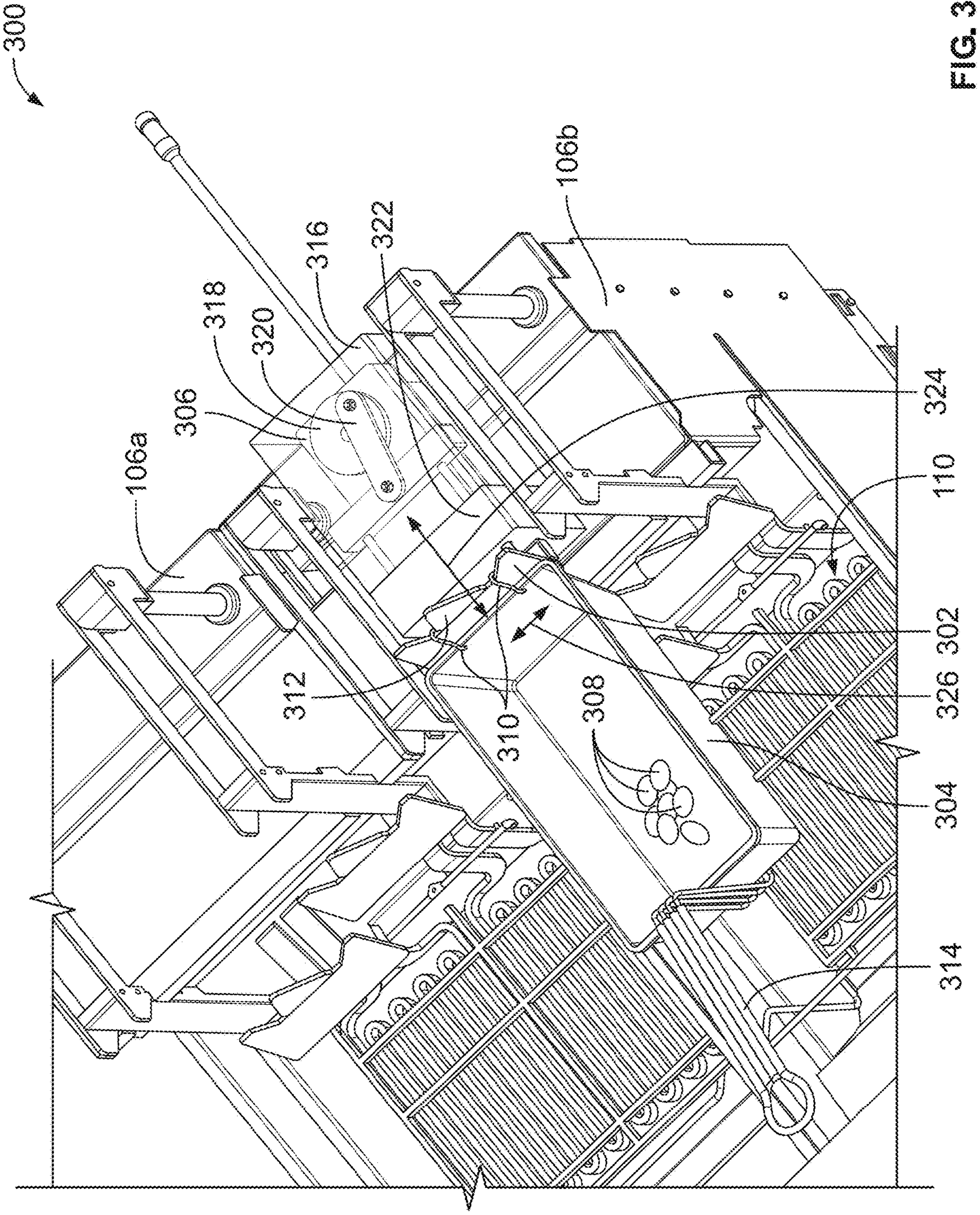
FIG. 3 shows a perspective view of a reciprocal agitator or shaking apparatus configured to impart horizontal movement to a basket with the agitator in a first position relative to the basket, in accordance with an embodiment of the present disclosure.
Figure 4:
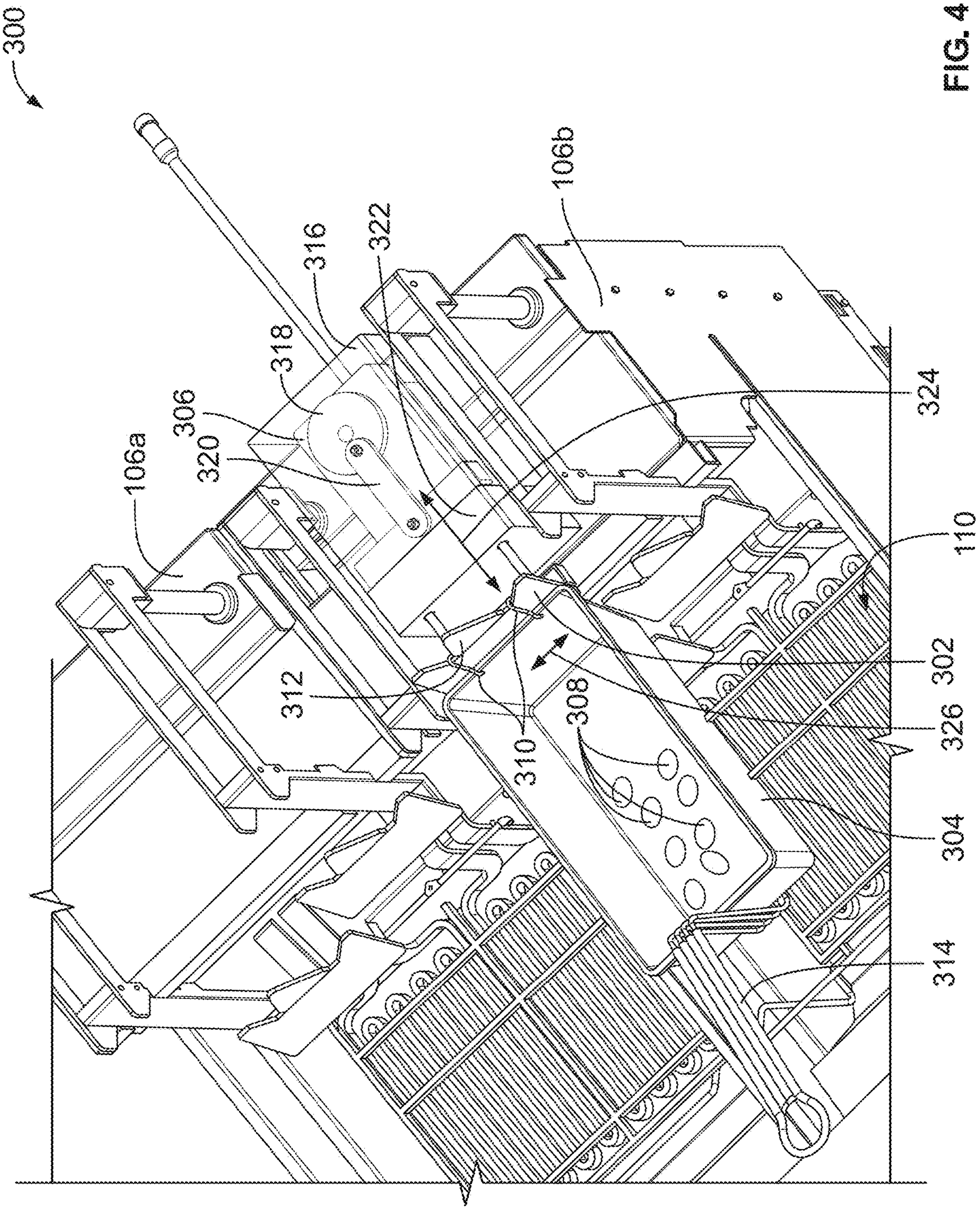
FIG. 4 shows a perspective view of the agitator of FIG. 3 with the agitator in a second position relative to the basket, in accordance with an embodiment of the present disclosure.

Referring now to FIGS. 3 and 4, an example component system 300 is illustrated and described in further detail. Generally, system 300 may include a basket retainer 302 that is configured to hold a basket 304 of fried consumable items 308 therein and a reciprocating agitator 306 configured to induce a reciprocal or "back and forth" motion of the basket retainer 302. In an example, fried consumable items 308 are french fries, chicken nuggets or strips, or the like, which are initially submerged in a frying medium, e.g., oil, contained in a vat 110. The consumable items 308 may be removed from the frying medium in vat 110 and agitated while being held above the vat 110 and/or frying medium. In example illustrations described herein, an agitator 306 may be linked with the basket retainer 302 that may "shake," e.g., in a linear or back-and-forth motion, the basket retainer 302. Accordingly, motion is imparted to the basket 304, which is filled with the consumable items 308. In this manner, the consumable items 308, initially relatively stuck together as illustrated in FIG. 3, may be broken apart or otherwise distributed relatively evenly within the basket 304 as illustrated in FIG. 4 to ensure the consumable items 308 are more evenly fried.

As illustrated in FIGS. 3 and 4, system 300 may include a basket retainer 302, in which a basket 304 of fried consumable items 308 may be held. The basket 304 may be configured to hold one or more of the consumable items 308. Each of the basket retainers 302 may include one of a hook, a lip, or a holding surface, and may sit atop an existing food processing device 106*a* and/or 106*b*, e.g., an existing fryer. Accordingly, each basket retainer 302 may be configured to retain an edge of the basket or a basket handle. As will be described further below, in the example illustrated in FIGS. 3 and 4 the basket 304 includes hooks 310 which are received on the basket retainer 302. A basket guide 312 defined by the basket retainer 302 protrudes through the hooks 310. Accordingly, the basket retainer 302 retains an end of the basket 304 that is opposite an end of the basket 304 having a handle 314. The handle 314 may facilitate grasping of the basket 304, e.g., by kitchen personnel and/or a robot or other automated device. With the basket 304 mounted to the basket retainer 302, the basket 304 may be raised and lowered relative to the vat 110, e.g., to submerge consumable items 308 within a cooking medium and remove consumable items 308 from the cooking medium. The basket retainer 302 may be provided on a raising/lowering device of the cooking devices 106*a* and/or 106*b*, and this raising and/or lowering of the basket 304 may be automated in any manner that is convenient. Merely by way of examiner, upon a basket 304 being submerged in the vat 110 and/or a cooking medium therein, the cooking device 106*a* and/or 106*b* may automatically raise the basket retainer 302 after expiration of a desired cooking time, thereby facilitating proper cooking of consumable items 308.

The agitator 306 may generally be configured to induce a reciprocal motion of the basket retainer 302, and thereby coming into repetitive contact with the basket 304 and/or the basket retainer 302. The reciprocating motion of the agitator 306 may thereby agitate consumable items 308 within the basket 304 while the basket 304 is held by the basket retainer 302. For example, the consumable items 308, to any extent they may become stuck together (e.g., as a result of freezing, thawing, cooking, etc.), may impact other consumable items 308 and/or interior walls of the basket 304 as a result of the shaking of the basket 304 caused by the agitator 306, thereby breaking apart the consumable items 308 into smaller and/or individual pieces of the consumable items 308. Example agitator(s) 306 may include a rotary motor, a linear actuator, and/or a vibrator. In the example illustrated in FIGS. 3 and 4, the agitator 306 comprises a motor 316 configured to induce the reciprocal motion of the basket retainer via a linkage 320 pivotally secured at an end thereof to a rotary output 318 of the motor 316. More specifically, the motor 316 may cause the rotary output 318, which as illustrated may be circularly or disc-shaped, to rotate about a center axis thereof. Accordingly, the linkage 320 causes contact block 322 to impact the basket retainer 302 or the basket 304, thereby shaking or agitating the basket 304. The agitator 306 may induce motion in various ways that are configured to break apart or redistribute consumable items 308 within the basket 304 to enhance the degree to which the consumable items 308 are evenly cooked, e.g., in a frying medium. For example, agitation of the basket retainer 302 and/or basket 304 may be performed with variable speeds, with different degrees/distances of motion, or with motion in different directions. In the example illustrated in FIG. 4, the reciprocal motion of the basket 304 is initiated in a first direction, as indicated by first direction arrow 324. The agitator 306 may, in some examples, be additionally configured to induce motion of the basket retainer 302 and/or basket 304 in a second direction 326 different from the first direction 324. For example, a linear motion of the basket retainer 302 may be applied at an angle to the basket 304 (e.g., by an angled surface of contact block 322 interfacing with or contacting the basket retainer 302 and/or basket 304), such that the agitating motion has a component in the first direction 324, as well as a second direction 326 normal or orthogonal to the first direction. It should also be noted that while the reciprocal motion illustrated in FIG. 4 is of a linear nature, this is not limiting and the agitation may be done via a vibration, up-and-down motion, tilting, or any other motion that might serve to enhance agitation of the consumable items.

Figure 5A:
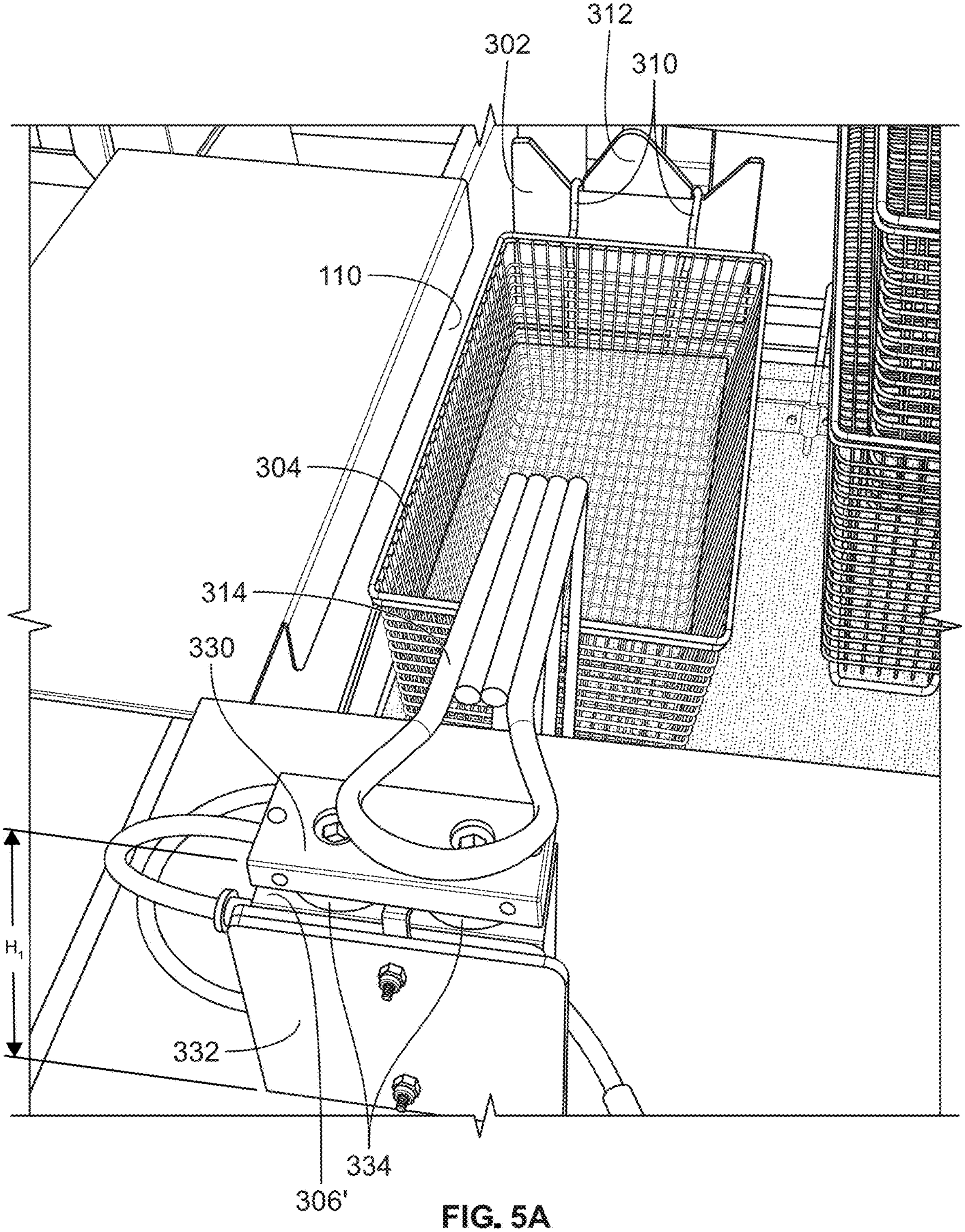
FIG. 5A shows a perspective view of another reciprocal agitator or shaking apparatus, which is configured to impart vertical movement to a basket, with the agitator in a first position relative to the basket, in accordance with an embodiment of the present disclosure.
Figure 5B:
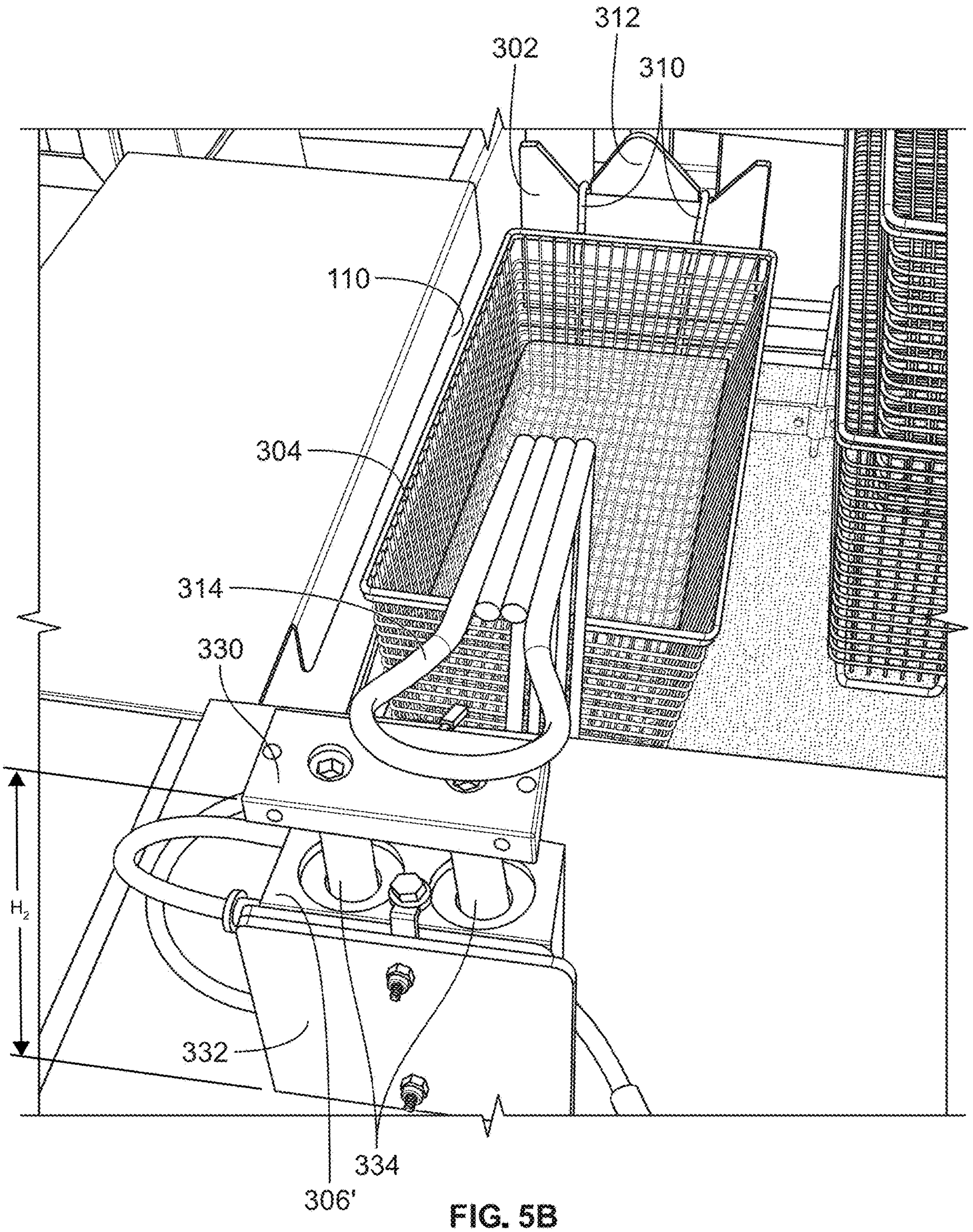
FIG. 5B shows a perspective view of the agitator of FIG. 5A with the agitator in a second position relative to the basket, in accordance with an embodiment of the present disclosure.

Turning now to FIGS. 5A and 5B, another component system 500 for agitating or shaking basket 304 is illustrated and described in further detail. As with the examples illustrated in FIGS. 3 and 4, the basket 304 may be positioned upon a basket retainer 302. Further, the basket retainer 302 may generally engage a first end of the basket 304 that is opposite an extension or handle 314 of the basket 304. More specifically, one or multiple hooks 310 fixed to the basket 304 are configured to hang over basket retainer 302.

In the component system 500, agitator 306' is provided, which is positioned adjacent the basket 304 at a same end of the basket 304 as the handle 314. The agitator 306' is configured to be extended generally vertically, such that a contact surface 330 of the agitator contacts the handle 314, forcing the basket 304 upwards. The contact surface 330 may extend vertically any distance that is convenient. As illustrated, in an example the contact surface 330 extends from an initial height $H_1$ (see FIG. 5A) relative to a support surface to an extended height $H_2$ (see FIG. 5B). The agitator 306' may quickly and repetitively extend upwards and downwards from a base 332 of the agitator 306', causing the handle 314 to be "bounced" up and down, impacting the agitator 306' and/or the contact surface 330. In this manner, the agitator 306' causes repetitive contact between the handle 314 of the basket 304 and the agitator 306'.

In an example, the agitator 306' comprises one or more pneumatic cylinders 334 extending from the base 332, which is mounted to the food processing device 106 adjacent the vat 110. As the pneumatic cylinders are extended from the base 332, e.g., due to increase/decrease of pneumatic pressure, the contact surface 330 is brought into repetitive contact with the handle 314 and/or basket 304, thereby imparting a shaking or otherwise repetitive motion of the basket 304 relatively quickly. Accordingly, consumable items 308 within the basket 304 are generally caused to break apart into smaller and/or individual pieces as a result of collisions with other consumable items 308 and/or interior walls of the basket 304. Additionally, the reciprocating agitator 306' may impact the handle 314 or other part of the basket 304 with sufficient force that the handle 314 (or, for that matter, any other part of the basket 304 being repetitively contacted) is forced away or "bounced" off of the contact surface 330 repeatedly. As a result, the agitator 306' causes the repetitive contact to be interspersed with a lack of contact between the reciprocating agitator 306' and the basket 304.

As noted above, the pneumatic cylinder(s) 334 generally extend and lower in a vertical direction with respect to the food processing device 106. As such, the reciprocal motion is vertically oriented with respect to the basket retainer 302.

The agitator 306' may operate with any frequency, force, etc. that is convenient to impart a desired shaking or reciprocating movement to the basket 304. In an example, the reciprocating agitator 306' in the illustrated example of FIGS. 5A and 5B reciprocates at a frequency of 0-6 Hz (i.e., up to six times per second). In another example, the reciprocating agitator 306' reciprocates with an amplitude of 0-4 inches per oscillation (e.g., corresponding to a distance traveled by the contact surface 330, or a difference between height $H_1$ and $H_2$ as illustrated in FIGS. 5A and 5B). In a further example, the reciprocating agitator 306' may reciprocate with at a frequency of 0-6 Hz and an amplitude of 0-4 inches per oscillation. These examples are not limiting, however, and any other amplitude or frequency of the oscillation or reciprocation of the reciprocating agitator 306' may be employed that is convenient. The reciprocation of the agitator 306' (and, for that matter, of agitator 306) may involve a repetitive translational motion between two endpoints.

As noted above, in some example approaches the food processing apparatus may be included in an automated food preparation system. The automated food preparation system may comprise a robot, robotic arm 102, conveyors, or any other automated movement mechanisms configured to move consumable items 308, e.g., from an ingredient storage to a cooking device 106, and from the cooking device(s) 106 to a finishing device. Accordingly, robot arm 102 may be used to position a basket 304 of consumable items 308 on the basket retainer 302 positioned atop a cooking device 106*a*/106*b*. The robotic arm 102 may also remove the basket 304 from the basket retainer 302, and/or transport the fried consumable items 308 into a finishing device after shaking initiated by the agitator 306 and/or 306' and basket retainer 302, e.g., as described above.

The basket retainer 302, in the examples illustrated above, may be positioned above a food processing device 106, e.g., a fryer, such that the agitator is configured to drop excess frying medium back into the vat 110.

Figure 6:
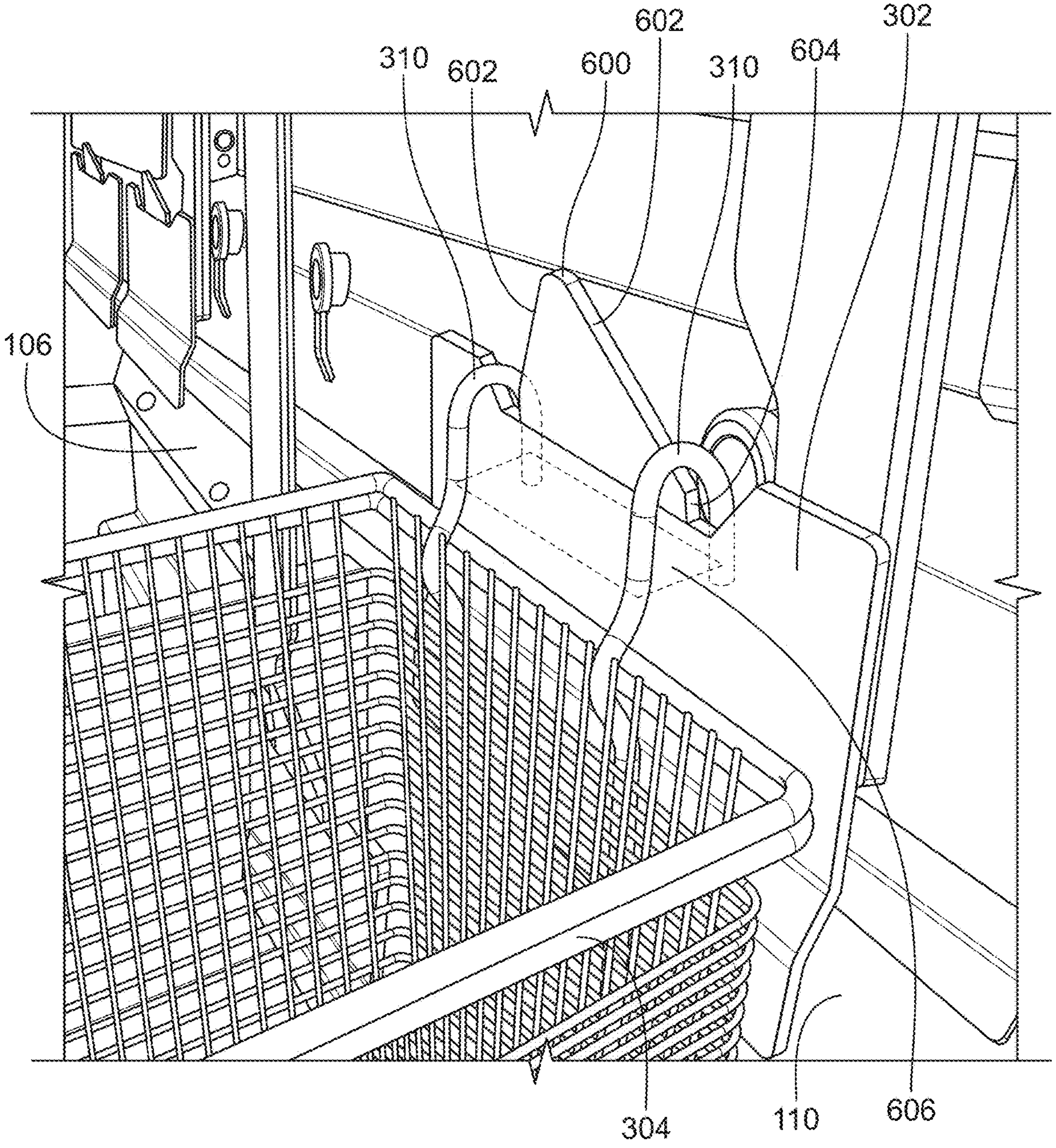
FIG. 6 shows a perspective view of a basket guide having a basket mounted thereto, in accordance with an embodiment of the present disclosure.
Figure 7A:
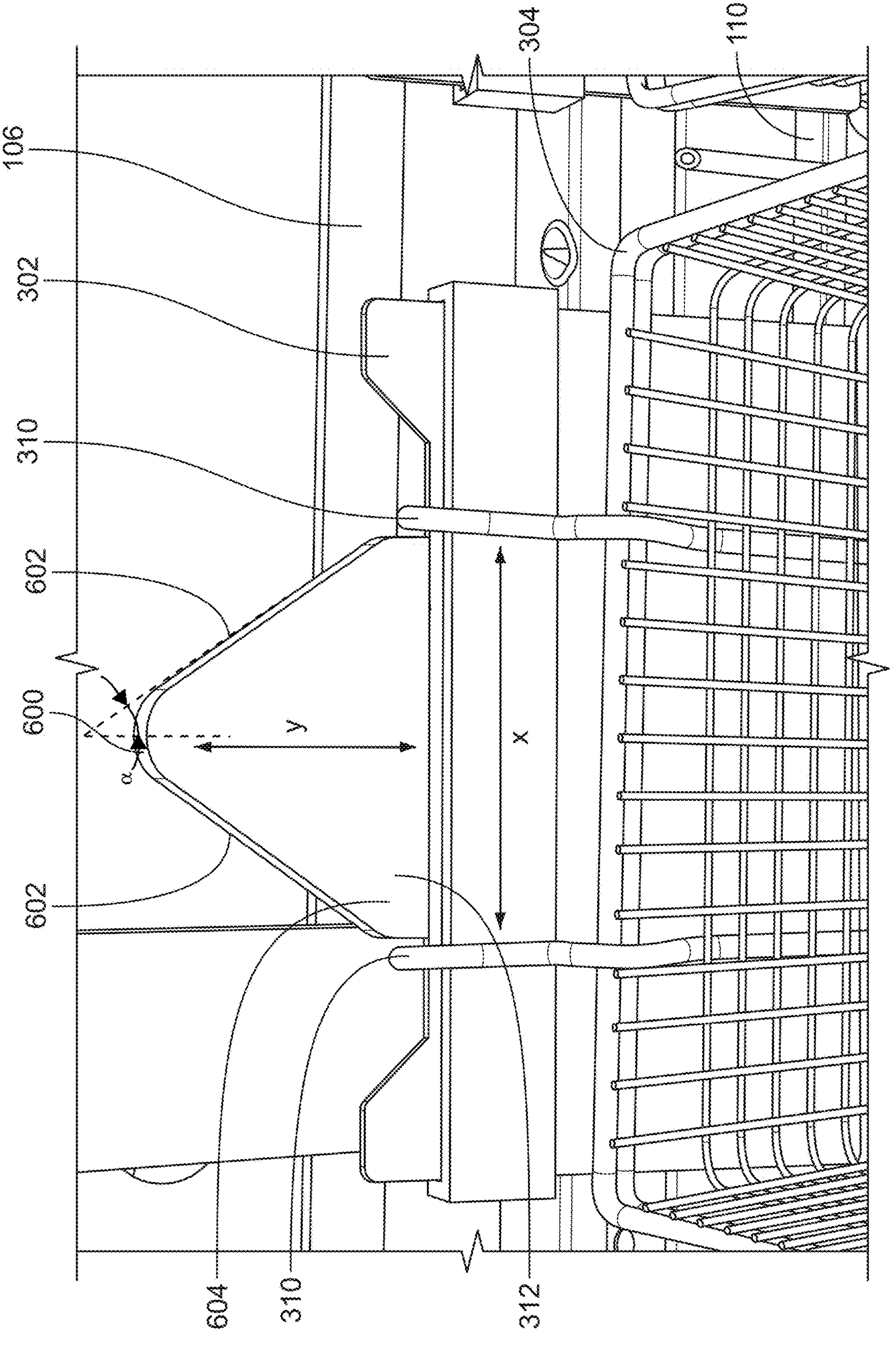
FIG. 7A shows a front view of the basket guide of FIG. 6, in accordance with an embodiment of the present disclosure.
Figure 7B:
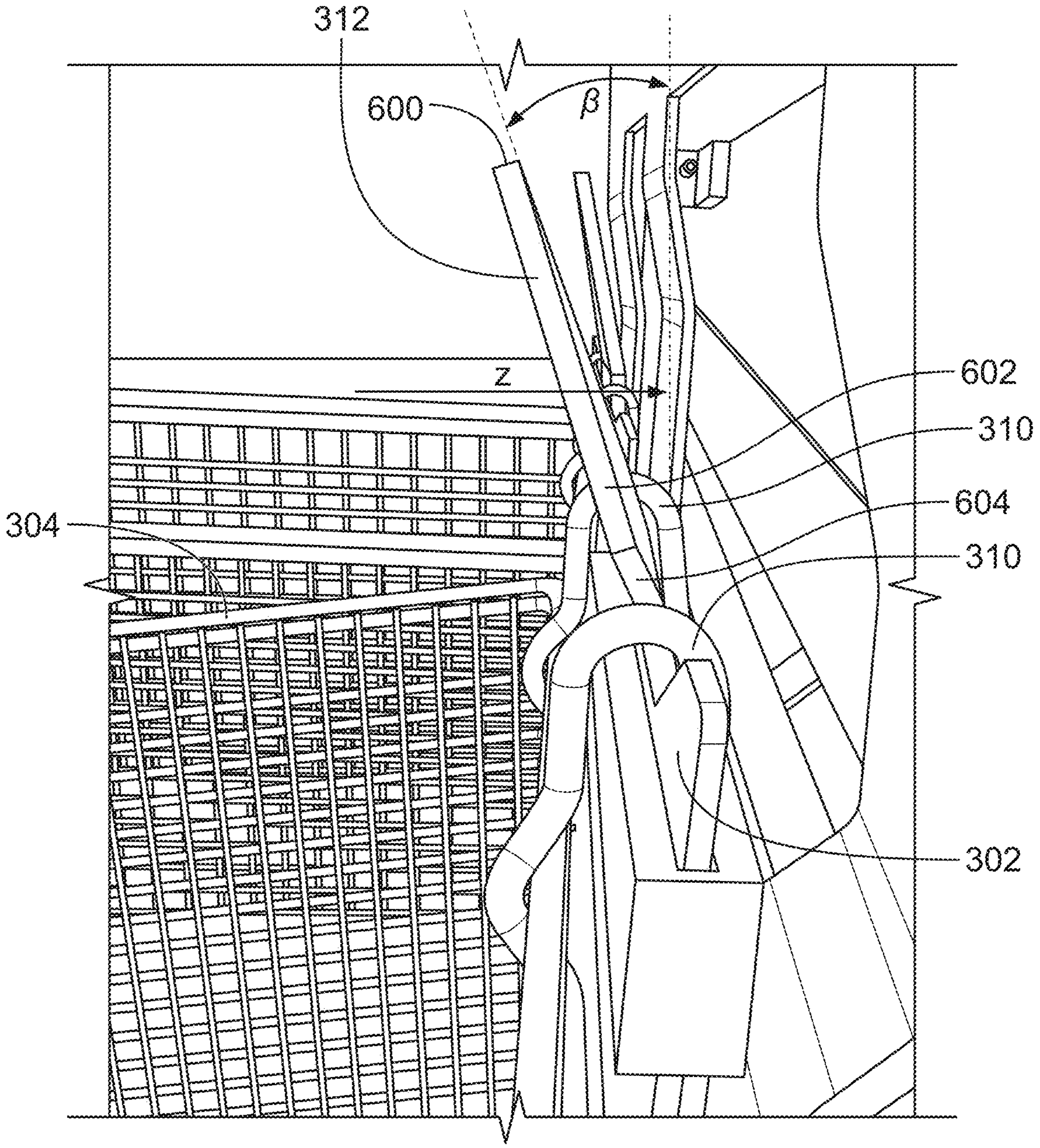
FIG. 7B shows a side view of the basket guide of FIGS. 6 and 7A, in accordance with an embodiment of the present disclosure.

As noted above, a basket guide 312 may be provided to enhance the degree to which a robot, e.g., robot arm 102, may place a basket 304 securely and safely throughout a life cycle of the involved components. Referring now to FIGS. 6, 7A, and 7B, the basket guide 312 will be described in further detail.

Generally, variations in the basket 304 or other food processing containers may occur, e.g., due to manufacturing tolerances or wear of components due to the extreme nature of the deep frying cooking environments. Further, different basket 304 may deflect or wear in different ways, or may be of different ages, causing positional variations from basket to basket. The automated device (e.g., the robotic arm) may be trained with one food processing container or basket using a blind pick and place protocol. Generally, this training process depends on the food processing container being in the exact, same position or substantially so in order to execute maneuvers to fry contents of the basket. In some embodiments, the order of the food processing containers may be changed, in which case the automated device may have difficulty adapting to the respective orientations of the other food processing containers/baskets, and as a result may be prone to dropping the new food processing container it blindly picks. Additionally, twist in handle 314 or other attachment extension of the basket 304 may result in the food processing container dipping towards the food processing area, e.g., into the vat 110. Manufacturer variance of baskets 304 or other food processing containers, and/or the hangers 310, may also affect the height of the handle 314. Automated devices such as robot 102 may not be able to compensate for the variation in height of the handle 314 and may tend to "miss" gripping the handle 314 when attempting to pick up the basket 304. In some embodiments, the basket 304 may be horizontally askew (e.g., along the x-axis) on the hanger of the food processing device 106, which may contribute to an inability of the automated device such as robot arm 102 to securely grip the basket 304 and/or handle 314.

Additionally, repeatability in height of handle 314 or other attachment extension may generally be difficult to achieve, which makes it challenging for the automated device (e.g., the robotic arm 102) to securely grip handle 314 and/or basket 304 when the order of the food processing containers 304 within the food processing device is switched. In some embodiments, manufacturing tolerance along with normal frying operation of the food processing containers may contribute to the height inconsistencies with each handle 314.

Positional variations and/or twist may be caused between the handle 314 or other attachment extension relative to the basket 304. Additionally, rotation of the one or more attachment hooks' 310 x-z plane about its y-axis obstructs the plane of the hangers 310, no longer making them co-planar, as a result of the attachment extension (e.g., the handle 314) experiencing twist. The twist may occur as a result of use of the basket 304 and handle 314 over time, attrition from the fry cooking process, and/or manufacturer variance. This misalignment can interfere with the automated device (e.g., the robotic arm 102) executing a relative movement of placing the basket's attachment hooks 310 upon the basket retainer 302 to allow the basket 304 to rest. In some cases this can result in the basket's hooks 310 hitting the top of the basket retainer 302 and/or the basket 304 not being securely mounted to the basket retainer 302 or other hanger. In an extreme case, the basket 304 may become dislodged from the basket retainer 302 and fall into the food processing area below the basket retainer 302, e.g., into the vat 110.

Accordingly, as illustrated in FIGS. 6, 7A, and 7B, example basket guides 312 are illustrated and described in further detail which may facilitate accurate placement of baskets 304 despite such wear, fatigue, or the like of the basket 304, handle 314, or other components. More specifically, the hooks 310 may be positioned above the food processing area, connected to the second side of the basket, with a basket guide 312 extending upwardly between the attachment hooks 310.

The basket guide 312 may have any configuration that is convenient. The basket guide 312 depicted in FIGS. 6, 7A, and 7B generally includes an angled parabolic lead-in feature or basket guide 312, which compensates for misalignment by the one or more attachment hooks 310, e.g., as a result of twist in the attachment extension (e.g., the handle 314) extending from the first side of the basket 304. The parabola's generally pointed tip 600 and forward angle may facilitate self-centering of the food processing container (e.g., basket 304), which ensures a repeatable location for the automated device (e.g., the robotic arm 102) to blindly pick handle 314 or other attachment extension. Accordingly, the automated device may securely grip and maneuver any basket 304, as opposed to a single food processing container the automated device trains with, within a food processing apparatus or system due to a consistent placement of the basket 304 on basket guide 312. It will be understood that the basket guide 312 doesn't require maintaining co-planar alignment between the one or more attachment hooks 310 of the basket 304 and the hanger(s) 310. To center the basket 304, the automated device may initially determine that the point 600 of the basket guide 312 resides within a field (e.g., an x-z plane) of the one or more attachment hooks before lowering the food processing container 304 onto the basket guide 312. The basket guide 312 is self-centering in all three spacial axes (e.g., x, y, and z), so, in some embodiments, the automated device may lower the one or more attachment hooks 310 over the basket guide 312 with a sizeable margin of error. The basket 304 may become centered as long as the point of the basket guide 312 initially resides within the x-z plane of the one or more attachment hooks 310 before further lowering the basket 304. In other words, to any extent the attachment hooks 310 and/or basket 304 is misaligned, as the basket 304 is lowered opposing guide surfaces 602*a*, 602*b* of the basket 304 will engage the attachment hooks 310, bringing the attachment hooks 310 to the appropriate resting place at a base 604 of the basket guide 312. It will be understood that the basket guide 312 can accommodate a substantial amount of twist in the handle 314 or otherwise in the basket 304 and, as mentioned above, allows the automated device (e.g., the robotic arm 102) to swap between different baskets 304 despite significant positional variations from basket to basket.

FIG. 7A generally shows the x-y plane (indicated by x-arrow and y-arrow) of the basket guide 312 attached to the basket 304, while FIG. 7B shows the z-axis (indicated by z-arrow) of the basket guide 312 attached to the basket 304. As mentioned above, the basket guide 312 depicted in FIG. 7A and FIG. 7B is generally self-centering in all three spatial axes due to the relatively wide base 604 of the basket guide 312. In an example, the base 604 defines a width of approximately 2.6 inches, being approximately the same width as a distance D between the two attachment hooks 310 connected to the second side of the basket 304. Additionally, the relatively narrow and/or pointed tip 600 of the basket guide 312, and a forward angle of the basket guide 312 (i.e., an angle of the guide relative to a vertical direction of the food processing device) also facilitate consistent placement of the basket 304 on the guide 312. In an example, the forward angle (e.g., as represented by angle $\beta$ illustrated in FIG. 7B) is between 5° and 30°. The illustrated guide 312 comprises a parabolic shape at least at an uppermost portion or vertex 600 of the guide 312, and which may extend from the base 604 (i.e., where the guide 312 attaches to or joins with the food processing or cooking device). A vertex 600 of the parabolic shape may be located at the uppermost portion. The edges 602 of the basket guide gradually widen from the basket guide's vertex 600 or point to form its base 604. Accordingly, as seen in the example illustrated in FIGS. 7A and 7B, the basket guide 312 is angled from the base 604 in a direction moving from above the food processing area toward the vat 110, coinciding with a direction of the basket 304 approaching a resting position on the basket retainer 302. As best seen in FIG. 7A, an angle $\alpha$ of the basket guide 312 (relative to a vertical direction of the food processing device, as shown) may be dictated by a height of the vertex 600 of the guide 312 (i.e., in the y-direction) relative to and a width of the base 604. The width of the base 604 may correspond to a lateral spacing (i.e., in the x-direction) between the hooks 310. Generally, a larger y-dimension of the vertex 600 and/or the guide 312 will result in a relatively smaller angle $\alpha$. Similarly, a smaller x-dimension of the width of the base 604 will also result in a relatively smaller angle $\alpha$. Merely as one example, the angle $\alpha$ may be less than 25 degrees.

Generally, an automated device (e.g., the robotic arm 102) may initially place the basket/attachment hooks 310 such that the vertex 600 or point of the basket guide 312 resides within the x-z plane 606 (see FIG. 6) of the one or more attachment hooks 310. The automated device may then lower the basket 304 until its hooks 310 are securely positioned at the base 604 of the basket guide 312, thus securing the basket 304 above the food processing area and/or the vat 110. In the examples illustrated, the automated device is afforded approximately a 1.3-inch margin of error along the x-axis of the basket guide 312 due to its width being approximately 2.6 inches. Any other size guide may be employed to provide a desired margin of error that is convenient. It should be noted that the width between the hooks 310 may also correspond to or be slightly larger than the width of the base 604.

FIGS. 6 and 7A depict the point 600 of the basket guide, i.e., an uppermost point of the guide, positioned within the x-z plane 606 (see FIG. 6) of the one or more attachment hooks 310 located at the second side of the basket 304. Training the automated device (e.g., the robotic arm) with the basket guide 312 includes moving the automated device to an indexing position over a food processing device 106 in one of the four locations within the food processing device, teaching the automated device a pick and place routine (e.g., opening a gripper of the arm 102, moving the arm 102 downward towards the food processing device 106, closing the gripper on the handle 314, moving the arm 102 upward with the basket 304 to secure its place on the basket guide 312 with a machine learning algorithm, and globally applying the pick and place routine to the remaining food processing containers or baskets 304 in the remaining locations within the food processing device 106. In some embodiments, any number of baskets 304 or other food processing containers may be included at an equal number of locations within the food processing device 106. In at least one example, each basket 304 may have a generally same design and/or dimensions. In an example, the basket 304 is 14 inches apart (center-to-center) from each other, so robot arm 102 may be offset by a fixed pitch (e.g., 14 inches) and then re-executes the pick and place routine with each available basket 304. In some embodiments, each basket 304 may be separated by any fixed pitch or distance. As described earlier, the automated device determines the point 600 of the basket guide 312 resides within the x-z plane 606 of the one or more attachment hooks 310 before securing the basket 304 onto the basket guide 312. It will be understood that the basket guide 312, as depicted in FIGS. 7A and 7B, tolerates extreme planar misalignment, caused by twist incorporated in the handle 314 or other extension from the basket 304, between the one or more attachment hooks 310 and the basket retainer 302. Generally, locating the relatively small uppermost point 600 inside the relatively larger field in the x-z plane 606 may increase repeatability and reduces the chance that an automated basket movement device such as robot arm 102 may "miss" placement of a hook 310 or other hanger of the basket 304.

Figure 8:
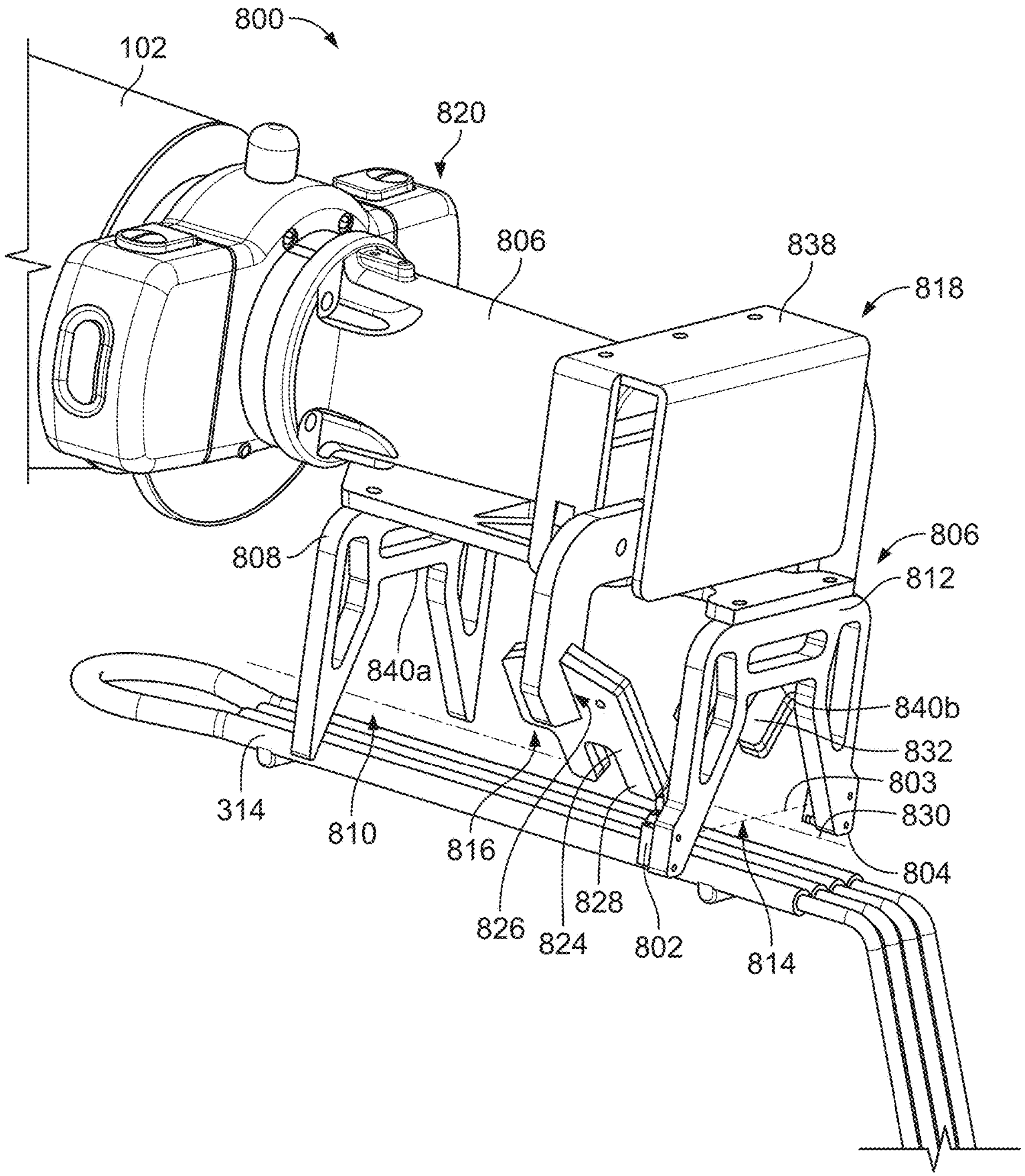
FIG. 8 shows a front-right side perspective view of an example manipulator, e.g., for use at an end of a robot arm, with a sensor for detecting proximity of a device to be handled by the manipulator, in accordance with an embodiment of the present disclosure.
Figure 9:
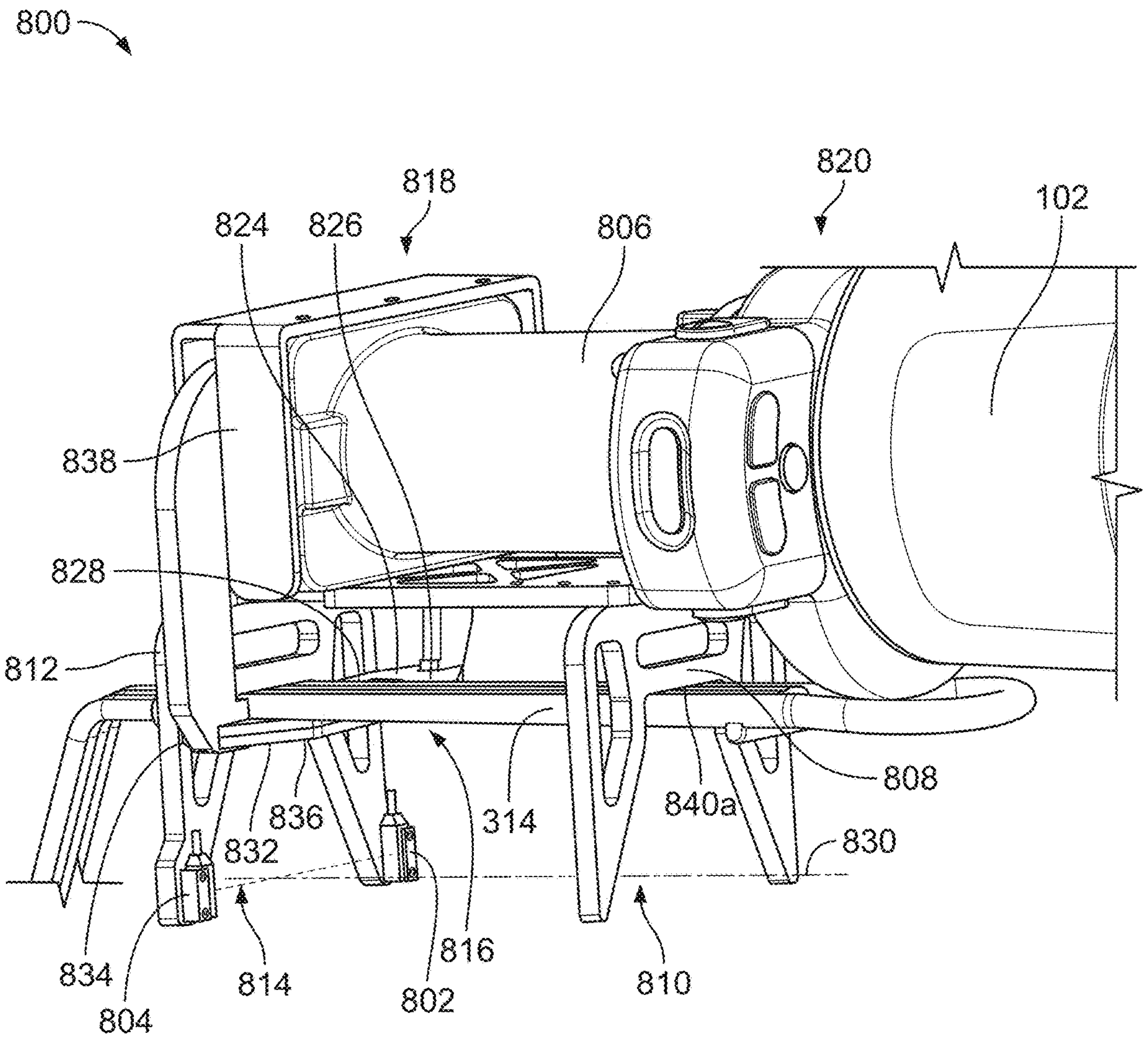
FIG. 9 shows a rear-left side perspective view of the manipulator and sensor of FIG. 8, in accordance with an embodiment of the present disclosure.

As noted above, in at least some example approaches automated food preparation may be assisted at least in part by a robotic arm 102, e.g., for handling and/or movement of basket 304. Referring now to FIGS. 8 and 9, another example component system 800 is described in further detail that is configured to facilitate detection, gripping, and handling of handle 314, e.g., for the purposes moving basket 304 as part of a process to fry consumable items. The system 800 may be employed for gripping and/or manipulation of any other extensions or elongated members. Generally, one or more sensors may be provided that are configured to determine a proximity of handle 314 or other elongate members or extensions in order to facilitate gripping the same. However, example sensors and sensing methods may be used in the context of any other gripping apparatus or manipulator that is convenient, and are not limited to the illustrated examples herein.

As noted above, basket 304 may have dimensional tolerances associated with various features. For example, hooks 310 may extend from a front surface of the basket 304, e.g., for gripping a tab or lip of cooking device 106 so that basket 304 can hang while the contents such as consumable items 308 are fried. The hanging of the basket 304 may allow a cooking medium, e.g., fryer oil, to drip off back into the vat 110 and the fried contents to cool. Additionally, the handle 314 or other extension extending away from the basket 304, as noted above, may be arranged at a height to enable the basket 304 to submerge contents below a surface of oil (or any other suitable cooking medium) in vat 110. The handle 314 typically protrudes out of the vat 110 and/or cooking medium therein so it may be accessible, e.g., for picking up and moving the fryer basket 304.

The robotic arm 102 may be employed to grab the fryer basket handle 314 and move the fryer basket as part of an automated or robotic fried food preparation method or system 100, as discussed above. Reliance on a height of the fryer basket handle 314 relative to a fryer feature, such as an edge of vat 110, can change a location of the handle 314 relative to the basket 304 and may thereby prevent consistent grabbing of the fryer handle 314. This may cause inadequate grip of the handle 314, potentially leading to the fryer basket's contents, e.g., consumable items 308, being spilled or overcooking of the contents. For example, relying upon contact of a robotic arm 102 or end effector thereof with handle 314, e.g., by detecting contact with a pressure sensor or the like, may yield inconsistent fryer basket handling because of variation between fryer basket assemblies. For example, as also noted above, variations in mounting hooks 310 and/or orientation of the handle 314 with respect to the basket 304 may cause the handle 314 to be positioned at different heights or locations. Accordingly, pressure sensors or the like may receive inconsistent force or load readings when force is applied downwards to grip the handle 314.

Accordingly, examples herein such as the component system 800 illustrated in FIGS. 8 and 9 may generally employ a sensor 802 configured to determine a proximity of the handle to a gripping location, e.g., within a handle opening of a gripper assembly. In some examples, a beam 803 is projected such that the sensor 802 detects an interruption of the beam 803, e.g., based upon a beam interrupt logic. Additional sensors generally may not be needed, and the robotic arm 102 may consistently grab handle 314 or other features of fryer basket 304. System 800 may also include at least one apparatus, station, or subsystem configured to grab handle 314, e.g., robot arm 102, to facilitate positioning or movement of fryer baskets 304. Additionally, component system 800 may be incorporated into or otherwise interface with existing automated food preparation systems, e.g., system 100.

In the examples illustrated in FIGS. 8 and 9, the fryer basket grabber apparatus or manipulator 806 and components thereof are generally comprised of aluminum. However, examples herein may be applied without limitation to other applications, and example manipulators may include components formed of other materials (e.g., a plastics or any other known food safe material).

In the example illustrated in FIGS. 8 and 9, the grabbing apparatus or manipulator 806 generally comprises a first extension 808 defining a first handle opening 810, and a second extension 812 defining a second handle opening 814. The second handle opening 814, as illustrated, is generally closer to a distal end of the robot arm 102 than the first handle opening 810. The manipulator 806 further includes a gripper assembly 816 configured to enclose handle 314 or other extension within the first handle opening 810 and the second handle opening 814. The manipulator 806 may also have a sensor 802 configured to determine a proximity of the handle 314 to the second handle opening 814. In some examples, the sensor 802 may be configured to determine a proximity of the handle 314 to the first handle opening 810, either as alternative or in addition to being configured to determine proximity of the handle 314 to the second handle opening 814. Generally, the sensor 802 is configured to detect interruption or breaking of the beam 803 projected across the second handle opening 814.

As noted above, in some examples, components of the fryer basket manipulator 806 may be formed of aluminum, e.g., the first extension 808, the second extension 812, and/or the gripper assembly 816. In some other embodiments, the first extension 808, the second extension 812, and the gripper assembly 816 are each formed of a food safe plastic. As illustrated in FIGS. 8 and 9, the first extension 808 may be arranged rearward of the second extension 812 with respect to a free end 818 of the manipulator 806, i.e., opposite an end 820 secured to robotic arm 102 or other movement apparatus for moving the manipulator 806. The manipulator 806 may comprise the robot arm 102 and processing circuitry configured to interface with the sensor 802. Accordingly, in the example illustrated the robotic arm 102 and processing circuitry are configured to interface with the sensor 802, an emitter 804 generating the beam 803, and the manipulator 806 and/or gripper assembly 816 thereof.

The gripper assembly 816 may have any components for grasping or gripping handle 314. As illustrated, the gripper assembly 816 generally employs pivotal arms or paddles configured to selectively hold handle 314 against a support surface. More specifically, gripper assembly 816 may generally have a first paddle or arm 824 pivotally connected at a proximal end 826 of the first arm 824, such that a distal end 828 of the first arm 824 is movable toward a centerline 830 of the manipulator 806. The gripper assembly 816 may also include a second paddle or arm 832 pivotally connected to the gripper assembly at a proximal end 834 of the second arm 832, such that a distal end 836 of the second arm is movable toward the centerline 830. The gripper assembly 816 may also include at least one actuator 838 configured to move or pivot at least one of the first arm 824 or the second arm 832. For example, the actuator may rotate the arms 824, 832 about their respective pivot points at ends 826 and 834, or the actuator 838 may fold the arms 824, 832 towards the centerline 830 of at least one of the fryer basket grabbing apparatus and handle 314. The arms 824, 832 may pivot to enclose the handle 314 against a support surface or base

840*a* of the first extension 808 and base 840*b* of the second extension 812. With the handle 314 enclosed and trapped against the bases 840*a* and 840*b*, the basket 304 is securely held by the manipulator 806, and the basket 304 may be moved, e.g., to place the basket 304 in a fryer or other cooking device 106, remove the basket 304 from a frying medium, remove the basket 304 from the cooking device 106, etc.

In some examples, the first extension 808 includes a first pair of arms 809*a*, 809*b* that define a first outline 811 corresponding to the first handle opening 810. Additionally, the second extension 812 may include a second pair of arms 813*a*, 813*b* that define a second outline 815 corresponding to the second handle opening 814.

The beam emitter 804 may be configured to emit a laser beam or a beam of light, or otherwise excite a medium arranged between the beam emitter 804 and the sensor 802. The sensor 802 may be configured to transmit an indication that the beam 803 being transmitted by the beam emitter 804 has been interrupted, e.g., indicating that the handle 314 is in proximity to the first handle opening 810 and/or the second handle opening 814, as indicated by at least a portion of the handle 314 being positioned between the arms 813*a*, 813*b* such that the beam 803 is interrupted. The sensor 802 and/or beam emitter 804 may be positioned on the gripper assembly 816 such that an interruption of the beam 803 occurs when the handle 314 is within a range of the second handle opening 814 small enough that the arms 824, 832 may capture the handle 314 securely as the arms 824, 832 pivoted to a closed position. Accordingly, the gripper assembly may be configured to enclose the basket handle 314 or other extension bringing the handle 314 against the base 840*a* and 840*b* in response to the beam of the beam emitter being interrupted, as illustrated in FIG. 9.

Figure 10:
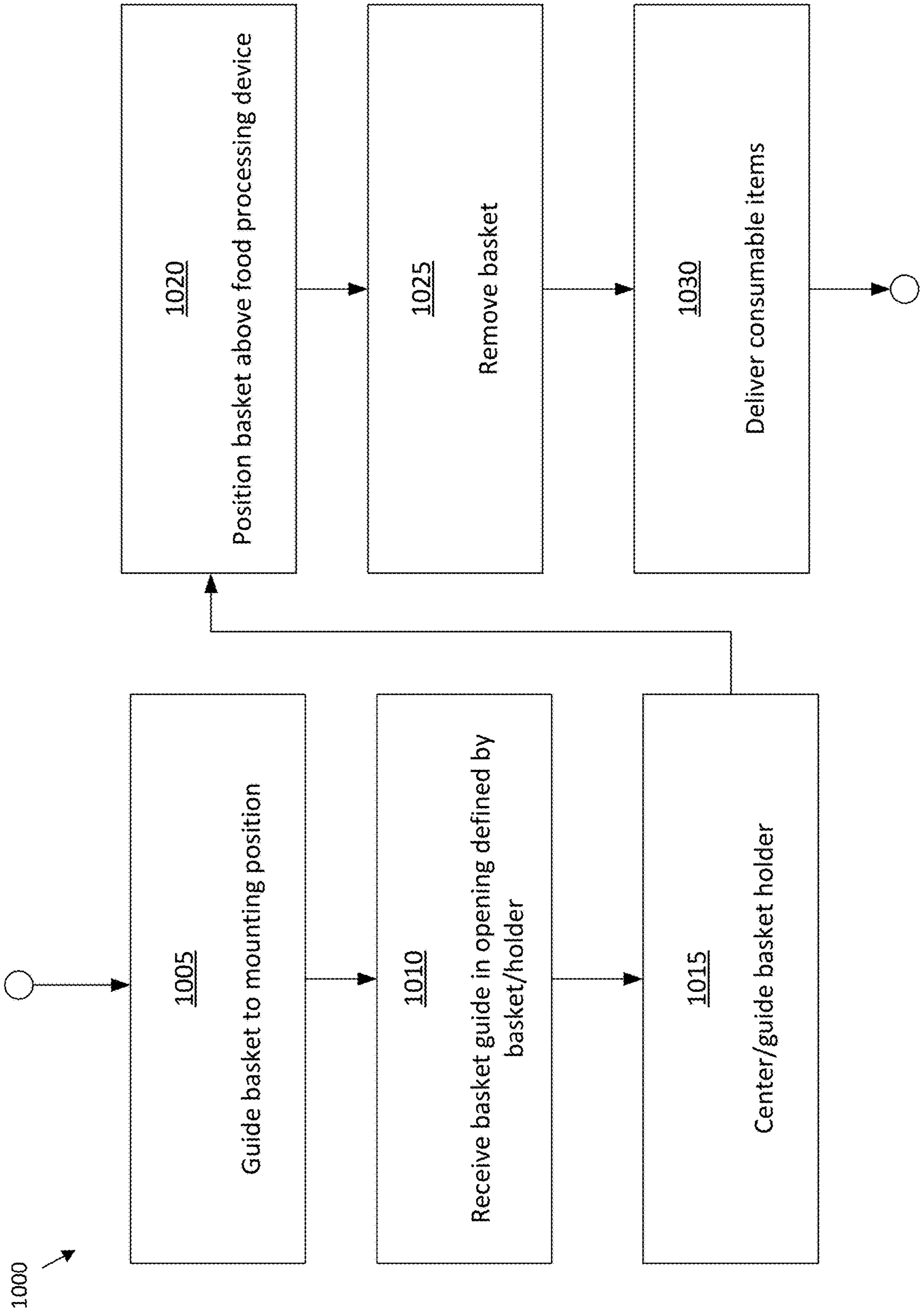
FIG. 10 shows a process flow diagram for a method of automated processing of one or more food items, in accordance with an embodiment of the present disclosure.

Turning now to FIG. 10, an example process 1000 for automating various aspects of a food preparation process is illustrated and described in further detail. As noted above, basket 304 may be moved or manipulated within system 100, e.g., to obtain consumable items 308 from a storage device for cooking, move the consumable items to a cooking device 106, initiate a cooking process for the consumable items 308, remove the consumable items 308 from the cooking device, and/or move the consumable items 308 to a finishing area or device. Accordingly, process 1000 and aspects thereof may be incorporated into or executed by the example system 100 described herein. As noted above, processing circuitry of system 100, e.g., as embodied in the robot arm 102, a control system for the robot arm 102, the manipulator 806, or other component of system 100 may enact various steps or processes within process 1000.

Process 1000 may begin at block 1005. At block 1005, a basket 304 may be guided to a basket mounting position on a food processing device, e.g., with a robot arm 102. For example, as noted above the food processing device 106 may have a basket guide 312 having a base 604.

Proceeding to block 1010, the basket guide 312 may be received in an opening of a basket holder fixed to the basket 304. For example, as noted above a vertex or tip 600 of guide 312 may be received within an opening as defined by x-z plane 606 of the hangers 310.

Proceeding to block 1015, the basket holder may be centered or manipulated by the basket guide 312 as the basket 304 descends to the basket mounting position. In an example, a positional variation of the basket 304, handle 314, or otherwise within system 100 may be corrected by engaging one or both hooks 310 with respective guide surfaces 602 of the basket guide 312. As described above, the guide surfaces 602 may generally extend from an uppermost portion of the guide 312, e.g., vertex 600, toward the base 604. In at least some examples, the guide surfaces 602 extend continuously from the vertex 600 to the base 604. The guide 312 may generally narrow laterally in a direction from the base 604 to the vertex 600 (or put another way, may widen moving from the vertex 600 toward the base 604). Accordingly, lateral positional variations may be corrected as the guide 312 contacts the hook(s) 310, thereby nudging the basket 304 laterally as the robot arm 102 lowers the basket 304 to a mounted position, e.g., on the basket retainer 302.

Proceeding to block 1020, the basket 304 containing consumable items 308 may be positioned above the vat 110, e.g., on the basket retainer 302. Process 1000 may initiate shaking or manipulation of the basket 304 to break up consumable items, shake off excess cooking medium, etc., either before, during, or after a cooking process has been carried out with respect to the consumable items 308. For example, as noted above a reciprocal motion may be imparted to consumable items 308 and/or the basket 304, e.g., by way of repetitive contact with an agitator 306 and/or 306'. Accordingly, reciprocal motion or agitation may be applied to the consumable items 308, thereby encouraging breakup of the consumable items 308 into smaller or individual pieces, shaking off excess cooking medium, etc. Process 1000 may then proceed to block 1025.

At block 1025, the basket 304 may be removed from the cooking device 106 and/or basket retainer 302 with a robot arm 102.

As part of any block or step within process 1000 involving the robot arm 102 grasping handle 314 or other extension of the basket 304, process 1000 may detect a proximity of the handle 314 prior to grasping or contacting the handle 314. For example, as the robot arm 102 approaches handle 314, e.g., to pick up the basket 304 from the cooking device 106 after frying, a manipulator 806 may employ a sensor 802 to detect a proximity of the handle 314. Merely by way of example, the proximity may be sufficient to allow the manipulator 806 to grasp the handle 314.

For example, as described above process 10000 may generate an indication that a beam 803 from a beam emitter 804 mounted to the robot arm 102 and/or manipulator 806 is prevented from being received by sensor 802 mounted to the robot arm 102. The beam emitter 804, for example, may be configured to emit a laser beam, a beam of light, or otherwise excite a medium arranged between the beam emitter 804 and the beam sensor 802 to facilitate detection of a proximity of the handle 314 for grasping by the manipulator 806. In an example, the indication corresponds to an interruption of the reception of beam 803 generated by the beam emitter 804 by the beam sensor 802. In response to receiving the indication, processing circuitry of the robot arm 102 may actuate gripper assembly 816 to enclose the handle 314, e.g., by pivoting or rotating arms/paddles 824, 832 to bring the handle 314 against base 840*a* and/or 840*b*.

Proceeding to block 1030, the fried consumable items 308 may be delivered to a finishing station with the robot arm 102. Process 1000 may then terminate.

The foregoing is merely illustrative of the principles of this disclosure and various modifications may be made by those skilled in the art without departing from the scope of this disclosure. The embodiments described herein are provided for purposes of illustration and not of limitation. Thus, this disclosure is not limited to the explicitly disclosed systems, devices, apparatuses, components, and methods, and instead includes variations to and modifications thereof, which are within the spirit of the attached claims.

The systems, devices, apparatuses, components, and methods described herein may be modified or varied to optimize the systems, devices, apparatuses, components, and methods. Moreover, it will be understood that the systems, devices, apparatuses, components, and methods may have many applications such as monitoring of liquids other than water. The disclosed subject matter should not be limited to any single embodiment described herein, but rather should be construed according to the claims.

What is claimed is:

1. A food processing apparatus, comprising:
- a basket retainer configured to support a basket of consumable items above a food processing device; and
- a reciprocating agitator comprising a pneumatic cylinder configured to reciprocate at a frequency of 0-6 Hz and impart a repetitive contact to the basket retainer such that the repetitive contact is interspersed with a lack of contact between the reciprocating agitator and the basket retainer, thereby inducing motion of the consumable items within the basket;
- a manipulator, comprising:
  - a first extension defining a first handle opening configured to receive a handle of the basket;
  - a second extension defining a second handle opening configured to receive the handle;
  - a gripper assembly configured to enclose the handle within the first handle opening and the second handle opening; and
- a sensor configured to determine a proximity of the handle to the second handle opening.

2. A food processing apparatus, comprising:
- a basket retainer configured to support a basket of consumable items above a food processing device;
- a reciprocating agitator configured to impart a repetitive contact to the basket retainer, thereby inducing motion of the consumable items within the basket; and
- a manipulator, comprising:
  - a first extension defining a first handle opening configured to receive a handle of the basket;
  - a second extension defining a second handle opening configured to receive the handle;
  - a gripper assembly configured to enclose the handle within the first handle opening and the second handle opening; and
  - a sensor configured to determine a proximity of the handle to the second handle opening.

3. The apparatus of claim 2, wherein the agitator includes one of a rotary motor, a linear actuator, a vibrator, or a pneumatic cylinder.

4. The apparatus of claim 2, wherein the agitator comprises:
- a rotary output; and
- a linkage pivotally secured at an end thereof to the rotary output such that the linkage induces the reciprocal motion of the basket retainer via rotation of the rotary output.

5. The apparatus of claim 2, wherein the reciprocal motion is along a first direction, and the agitator is configured to induce an additional motion in the basket retainer in a second direction, wherein the second direction is normal to the first direction.

6. The apparatus of claim 2, wherein the reciprocal motion is vertically oriented with respect to the basket retainer.

7. The apparatus of claim 2, wherein the reciprocal motion is horizontally oriented with respect to the basket retainer.

8. The apparatus of claim 2, wherein the basket retainer is configured to contact one of an edge of the basket or the basket handle.

9. The apparatus of claim 2, wherein the basket retainer includes one of a hook, a lip, a holding surface, or a support surface.

10. The apparatus of claim 2, wherein the agitator comprises a pneumatic cylinder configured to impart the repetitive contact to the handle of the basket.

11. The apparatus of claim 10, wherein the reciprocal motion is vertically oriented with respect to the basket retainer.

12. The apparatus of claim 10, wherein the reciprocating agitator reciprocates at a frequency of 0-6 Hz.

13. The apparatus of claim 2, wherein the reciprocating agitator is configured such that the repetitive contact is interspersed with a lack of contact between the reciprocating agitator and the basket.

14. The apparatus of claim 2, wherein the food processing device is a fryer.

15. The apparatus of claim 2, wherein the basket retainer comprises a guide having a base configured to be positioned adjacent a basket mounting position on the food processing apparatus, wherein the basket guide narrows from the base to an uppermost portion, wherein opposing guide surfaces of the basket guide extend from the uppermost portion toward the base and are configured to horizontally align a basket holder with respect to the basket mounting position as the basket holder descends toward the basket mounting position.

16. The apparatus of claim 2, wherein the sensor comprises at least one of a beam receiver, an imaging sensor, a position sensor, a pressure sensor, a proximity sensor, or a motion sensor.

17. An automated food processing system, comprising:
- a food processing container, comprising:
  - a basket;
  - an attachment extension extending from a first side of the basket; and
  - one or more attachment hooks located at a second side of the basket;
- a robotic arm including a manipulator, comprising:
  - a first extension defining a first handle opening configured to receive a handle of the basket;
  - a second extension defining a second handle opening configured to receive the handle;
  - a gripper assembly configured to enclose the handle within the first handle opening and the second handle opening and grip the attachment extension, wherein while the attachment extension is gripped the robotic arm is configured to move the food processing container; and
  - a sensor configured to determine a proximity of the handle to the second handle opening; and
- a food processing device, comprising:
  - a food processing area and a basket retainer above the food processing device;
  - a basket guide adjacent the basket retainer, the basket guide narrowing from a base adjacent a basket mounting position on the basket retainer to an uppermost portion, wherein opposing guide surfaces of the basket guide extend from the uppermost portion toward the base and are configured to horizontally align the one or more attachment hooks with respect to the basket mounting position as the robotic arm causes the food processing container to descend toward the basket mounting position.

18. The food processing system of claim 17, further comprising an agitator configured to induce a reciprocal motion of the basket retainer, thereby inducing motion of the basket.

19. The food processing system of claim 17, wherein the one or more attachment hooks are disposed at an end of the basket opposite the attachment extension, wherein the one or more attachment hooks define a horizontal opening delimited at opposing sides corresponding to the opposing guide surfaces, and wherein the horizontal opening is substantially equal to a width of the base.

* * * * *